(12) United States Patent
Cudzilo et al.

(10) Patent No.: US 7,761,376 B2
(45) Date of Patent: Jul. 20, 2010

(54) METHOD FOR PROVIDING FUNDING OF AND ACCESS TO AN INVESTMENT VEHICLE

(75) Inventors: Leonard Charles Cudzilo, Chicago, IL (US); Patrick Joseph Callahan, Jr., Chicago, IL (US)

(73) Assignee: Excellerated Income Benefits Company, Inc., Oak Brook, IL (US)

( * ) Notice: Subject to any disclaimer, the term of this patent is extended or adjusted under 35 U.S.C. 154(b) by 987 days.

(21) Appl. No.: 11/040,982

(22) Filed: Jan. 21, 2005

(65) Prior Publication Data

US 2006/0167775 A1  Jul. 27, 2006

(51) Int. Cl.
*G06Q 40/00* (2006.01)
(52) U.S. Cl. .............................. 705/39; 705/35; 705/36; 705/38; 705/42; 705/45; 395/235
(58) Field of Classification Search .................... 705/39, 705/38, 31, 35, 36, 42, 45; 395/235
See application file for complete search history.

(56) References Cited

U.S. PATENT DOCUMENTS

| | | | | |
|---|---|---|---|---|
| 4,700,297 | A | | 10/1987 | Hagel, Sr. et al. |
| 5,285,384 | A | * | 2/1994 | Gineris ......................... 705/31 |
| 5,775,734 | A | * | 7/1998 | George, Jr. .................... 283/57 |
| 5,806,047 | A | * | 9/1998 | Hackel et al. .............. 705/36 R |
| 5,812,987 | A | * | 9/1998 | Luskin et al. .............. 705/36 R |
| 5,839,118 | A | * | 11/1998 | Ryan et al. ................. 705/36 R |
| 5,903,879 | A | * | 5/1999 | Mitchell ..................... 705/36 R |
| 5,913,198 | A | * | 6/1999 | Banks ....................... 705/36 R |
| 5,946,669 | A | * | 8/1999 | Polk ............................. 705/40 |
| 5,966,693 | A | * | 10/1999 | Burgess ......................... 705/4 |
| 6,041,313 | A | * | 3/2000 | Gilbert et al. ............. 705/36 R |
| 6,108,641 | A | * | 8/2000 | Kenna et al. .................. 705/35 |
| 7,302,413 | B1 | * | 11/2007 | Bent et al. ..................... 705/38 |
| 2001/0034676 | A1 | | 10/2001 | Vasic |
| 2002/0042772 | A1 | | 4/2002 | Rudman et al. |
| 2003/0074311 | A1 | | 4/2003 | Saylors et al. |
| 2004/0044616 | A1 | | 3/2004 | Salter |
| 2004/0098328 | A1 | | 5/2004 | Grant et al. |
| 2004/0111370 | A1 | | 6/2004 | Saylors et al. |
| 2004/0138990 | A1 | | 7/2004 | Hardin et al. |
| 2005/0108120 | A1 | * | 5/2005 | Malka et al. .................. 705/35 |

* cited by examiner

*Primary Examiner*—Gerald J. O'Connor
*Assistant Examiner*—Hiep V. Nguyen
(74) *Attorney, Agent, or Firm*—Steven A. Maynard; Conduit Technology Partners

(57) ABSTRACT

A method for providing funding of and access to an investment vehicle, comprises the steps of establishing an investment vehicle, monetizing the investment vehicle by depositing funds therein by at least one predetermined investor, receiving a request for the funds by an employee of an employer, distributing the funds from the investment vehicle to a financial institution via a management entity upon direction of the management entity in response to the employee's request, transferring the funds from the financial institution to the employee via the employer, utilizing the funds for a predetermined economic activity by the employee, remitting the funds to the financial institution from an employee's subsequent earnings via an employer payroll system, redepositing the funds, remitted to the financial institution, into the investment vehicle via the management entity, and wherein the basis for the investment vehicle is the value of an employee's continuing employment with an employer.

15 Claims, 6 Drawing Sheets

METHOD FOR PROVIDING FUNDING OF AND ACCESS TO AN INVESTMENT VEHICLE

FIELD OF THE INVENTION

The present invention relates to a business method for providing funding of and access to investment vehicles, and more specifically, to investment vehicles wherein the value of an employee's continuing employment with an employer is the basis for such a vehicle.

BACKGROUND OF THE INVENTION

The involvement of financial institutions and employers to provide loan programs to employees and to deduct from an employee's future earnings the pay back for such loans is known in the art. It is also known that the cost and administrative burdens to the employer of offering such a benefit is sufficient to cause the employer to not offer such a benefit in an employee benefits program. Additionally, the risk of an employee defaulting on such a loan is sufficient to deter employers and/or financial institutions from offering such a benefit. Further, if offering a standardized loan program, it is generally done with restrictive qualification criteria, thereby limiting the use of such a program to a marginal group of employees. Such criteria makes it difficult for all but the most highly qualified or the most needy employees to be offered such a loan for uses as significant as the purchasing or refinancing of a home.

It is therefore desired to provide funding of and access to an investment vehicle that transfers the risks of such an employer and/or financial institution sponsored and managed employee benefit to an investment community. Such a transfer of risk will allow for more employers and employees to have access to and receive funding from such an investment vehicle than is currently available with employer and/or financial institution sponsored and managed employee benefits programs.

SUMMARY OF THE INVENTION

It is an object of the present invention to provide a method that overcomes the disadvantages of the prior art.

Accordingly, the present invention advantageously provides a method for providing funding of and access to an investment vehicle, comprising the steps of; establishing an investment vehicle, monetizing the investment vehicle by depositing funds therein by at least one predetermined investor, receiving a request for the funds by an employee of an employer, distributing the funds from the investment vehicle to a financial institution via a management entity upon direction of the management entity in response to the employee's request, transferring the funds from the financial institution to the employee via the employer, utilizing the funds for a predetermined economic activity by the employee, remitting the funds to the financial institution from an employee's subsequent earnings via an employer payroll system, redepositing the funds, remitted to the financial institution, into the investment vehicle via the management entity, and wherein the basis for the investment vehicle is the value of an employee's continuing employment with an employer.

It is a feature of the present invention that the investment vehicle is a securitized investment vehicle.

It is an additional feature of the present invention that the predetermined economic activity is a real estate transaction.

BRIEF DESCRIPTION OF THE DRAWINGS

These and other objects, features, and advantages of the present invention will become apparent from a reading of the following detailed description with reference to the accompanying drawings, in which.

DESCRIPTION OF THE PREFERRED EMBODIMENT(S)

Figure 1:
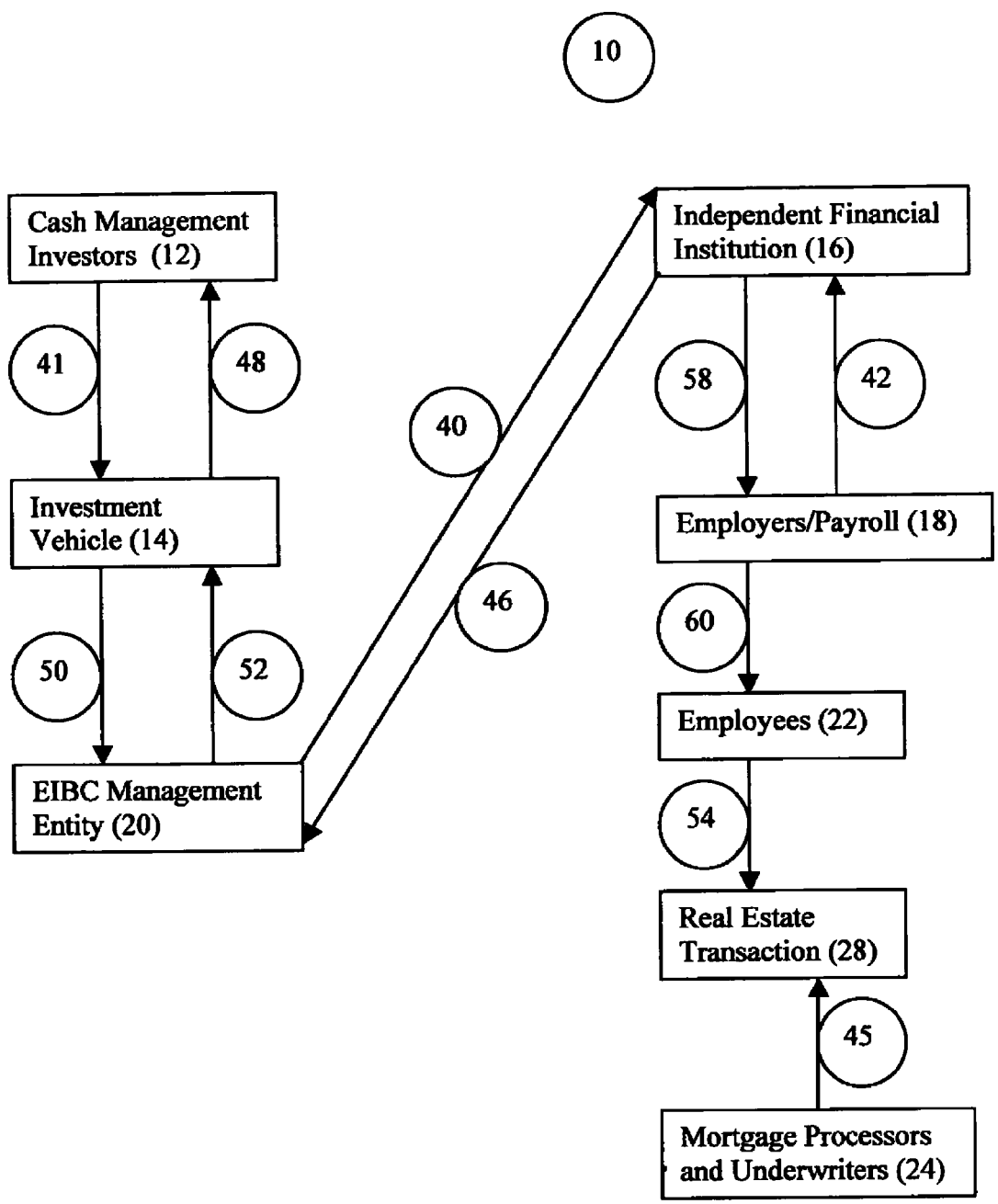
FIG. 1 is a flow diagram showing a monetization, disbursement, and repayment of funds from an investment vehicle of the present invention.
Figure 2:
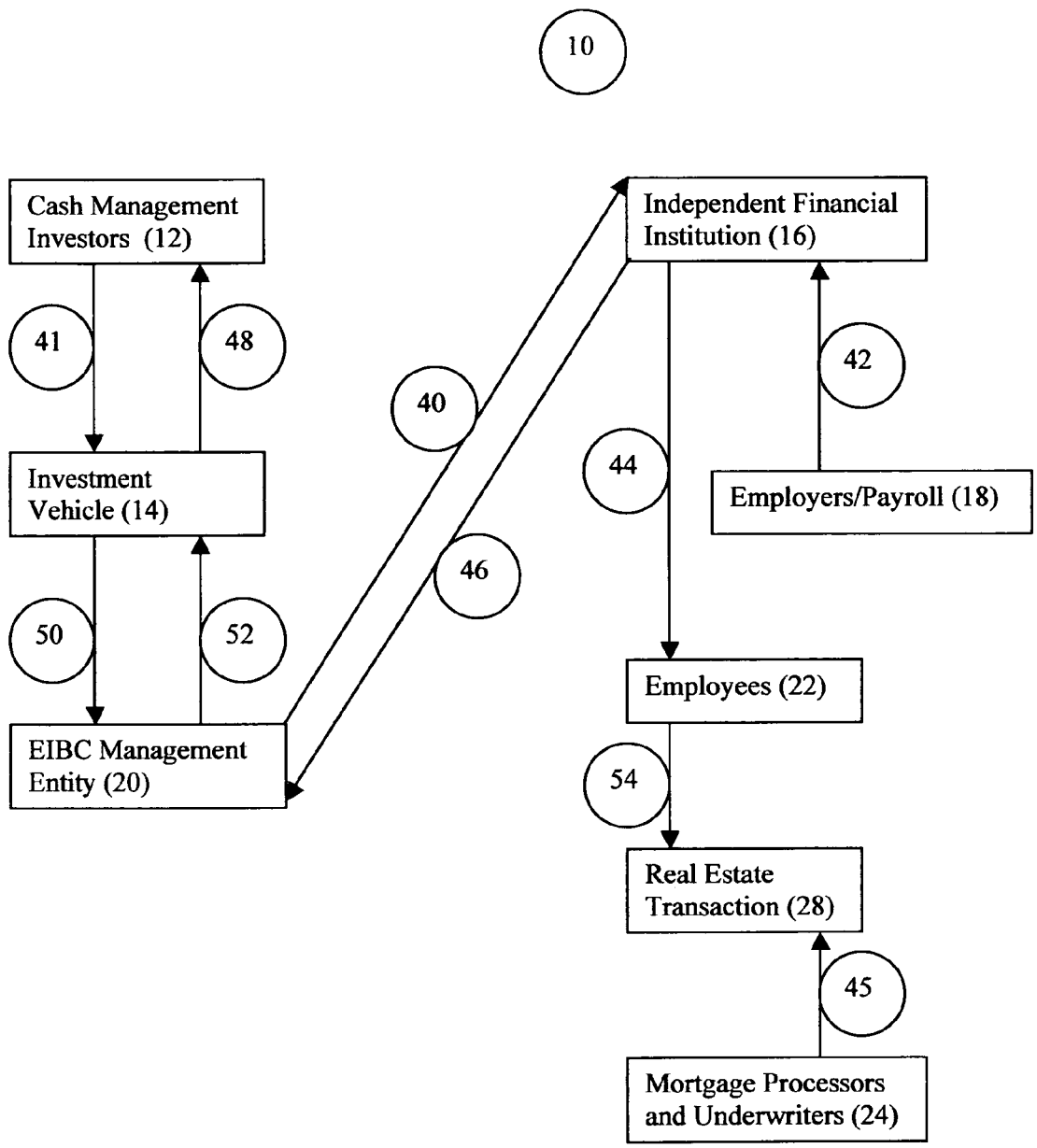
FIG. 2 is an alternative embodiment of a flow diagram showing the monetization, disbursement, and repayment of funds from the investment vehicle of the present invention.
Figure 3:
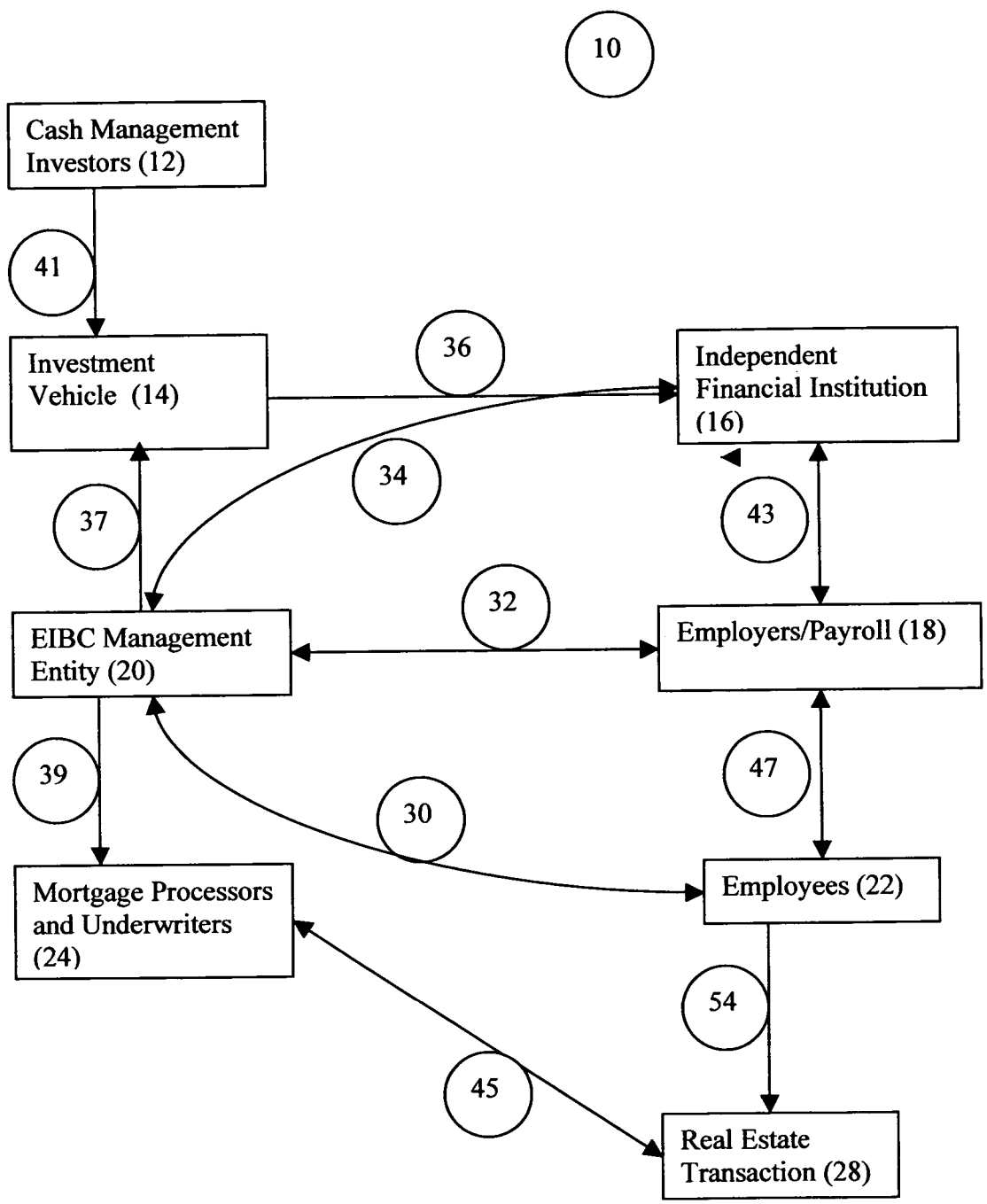
FIG. 3 is a flow diagram showing the relationships between each of the participants that provide access to the investment vehicle of the present invention.
Figure 4:
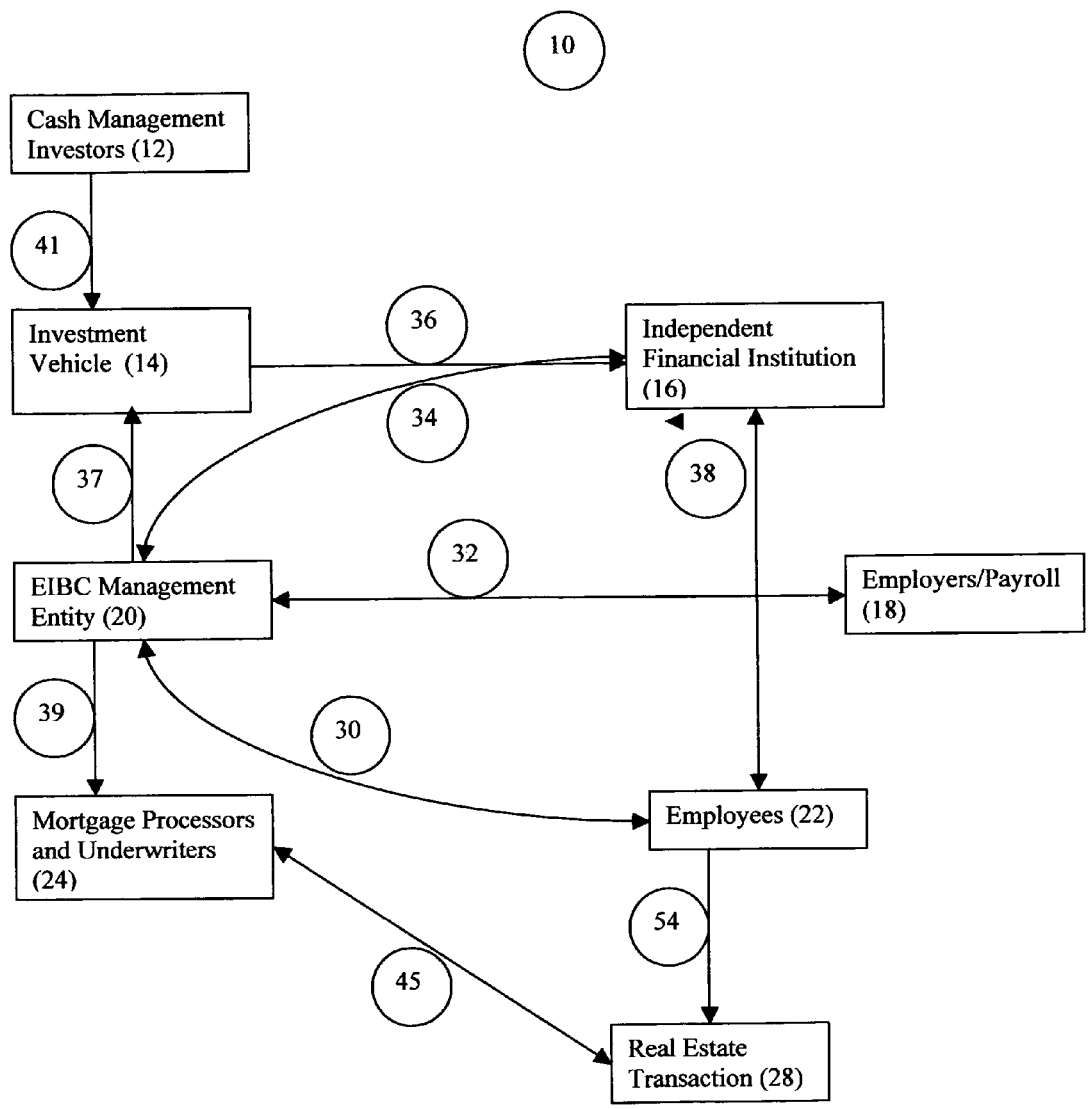
FIG. 4 is an alternative embodiment of a flow diagram showing the relationships between each of the participants that provide access to the investment vehicle of the present invention.

Referring to FIGS. 1,2,5,6 & 3,4 respectively, a flow diagram 10 generally refers to a method for providing funding of and access to an investment vehicle and the relationships between each of the participants in the process of financing, by way of example, a real estate transaction for the present invention. Other uses for the herein described funds will be apparent to those skilled in the art. For example, the funds may be used for paying down credit card debt or student loans, as well as for other personal financial purposes without departing from the scope of the present invention. Specifically, FIGS. 1, 2, 5 & 6 describe the funding and the direction of the flow of funds between participants for such a business method. FIGS. 3 & 4 describe the relationships of the participants when the funds are accessed for such a business method.

To begin, a novel money management and business method for providing funding of and access to specific purpose funds, preferably in the form of a securitized or divisible investment vehicle 14, is hereby recognized as an investable asset for cash management investors 12: the Value of an Employee's Continuing Employment with an Employer ("VECEE"). Cash management investors 12 may be individuals, corporations, financial institutions or any other entity seeking to invest in financial instruments as are known in the art. This VECEE asset is a unique view in the world work force market, particularly when being used as a basis for an investment vehicle 14. VECEE recognizes the societal and economic advantages of the employee 22 and employer 18 relationship. The advantage to the employer 18 for offering access to a VECEE asset based investment vehicle 14 is that an employee 22 may maintain longer employment with such an employer 18 thereby saving the employer 18 the expenses of hiring and training replacement employees 22. Further, monetizing an investment vehicle 14 based on this VECEE asset allows employees 22 to leverage their future productivity, which may be a significant percentage of the employee's 22 annual income, while also creating an incentive to remain in the work force.

The investment vehicle 14 is an investable instrument that provides an employee 22 with access to monetized and fungible VECEE asset based funds, accessible by an employee 22, preferably through an employer 18, when engaging in a predetermined economic activity. An employer 18 is defined broadly to include trade associations, unions, and fraternal organizations, etc., in addition to the traditional employer/employee relationships. The investment vehicle 14 carries the risk of default heretofore assumed by the employers 18 and/or participating financial institutions 16 in loan scenarios. Financial institutions 16 are considered banks and equivalent lending entities such as JPMorgan, Wells Fargo and Citibank, or any other commercial or personal lending organizations etc., as known in the art. The investment vehicle 14 may be in the form of a security or any other investment structure that assumes the default risk at the expense of the investor 12 as opposed to the employers 18 and/or financial institutions 16. The investment vehicle 14 may have features such as partnership interests, bonds, notes, bills, and money market funds, by way of example, and are not deemed as exhaustive. Heretofore, the employers 18 and/or financial institutions 16 have not only assumed the risk of default, but also the cost and administrative burdens. The herein described embodiments, the funding, marketing, and administration of the investment vehicle 14 are managed via an Excellerated Income Benefits Company ("EIBC") management entity 20.

Such an EIBC management entity 20 assumes the management and administration, described in further detail below, inherent in such a business method to the benefit of both the employee 22 and the employer 18. Advantageously, an employer 18 is more likely to offer the VECEE asset based investment vehicle 14 benefit to employees 22 in light of the management and administration being assumed by the EIBC management entity 20. In essence, an employee's 22 access to the investment vehicle 14, based on the value of their continuing employment with an employer, is enhanced by the flexibility and freedom of the investment community. Further, the employee 22 is more likely to qualify for access to and use of the benefit if the benefit were not limited by the restrictive qualification criteria of the financial institutions 16.

The VECEE funds in the investment vehicle 14 preferably have levels of security including: access to the employee's portion of the employer's payroll; terms and conditions of the payroll deduction; the term of the pay back period, and assignability of such terms to subsequent employers; and a second mortgage of short or medium-term duration.

As shown in FIGS. 1 & 3, the VECEE funds are deposited 41 into the investment vehicle 14 by the cash management investors 12 up to a predetermined monetization level administered 37 via the EIBC management entity 20. Upon receiving a request for access 47 to the VECEE funds by an employee 22 via 32 the employer 18, the EIBC management entity 20 directs access 37 to the VECEE funds of the investment vehicle 14 for the employee 22. The VECEE funds are then distributed 50 from the investment vehicle 14 and transferred 40 to the financial institution 16 via the EIBC management entity 20. The VECEE funds are then further transferred 58 to the employer 18, which in turn are again transferred 60 to the employee 22 and are utilized 54 for preferably a real estate transaction 28, for example.

Alternatively as shown in FIG. 2, the VECEE funds may be transferred 44 directly to the employee 22 independent of the employer 18, without departing from the scope of the present invention. In conjunction with this alternative as shown in FIG. 4, an access request 38 is received via 34 the financial institution 16 and is subject to direction 37 by the EIBC management entity 20, as opposed to received via 32 the employer 18 as shown in FIG. 3.

Figure 5:
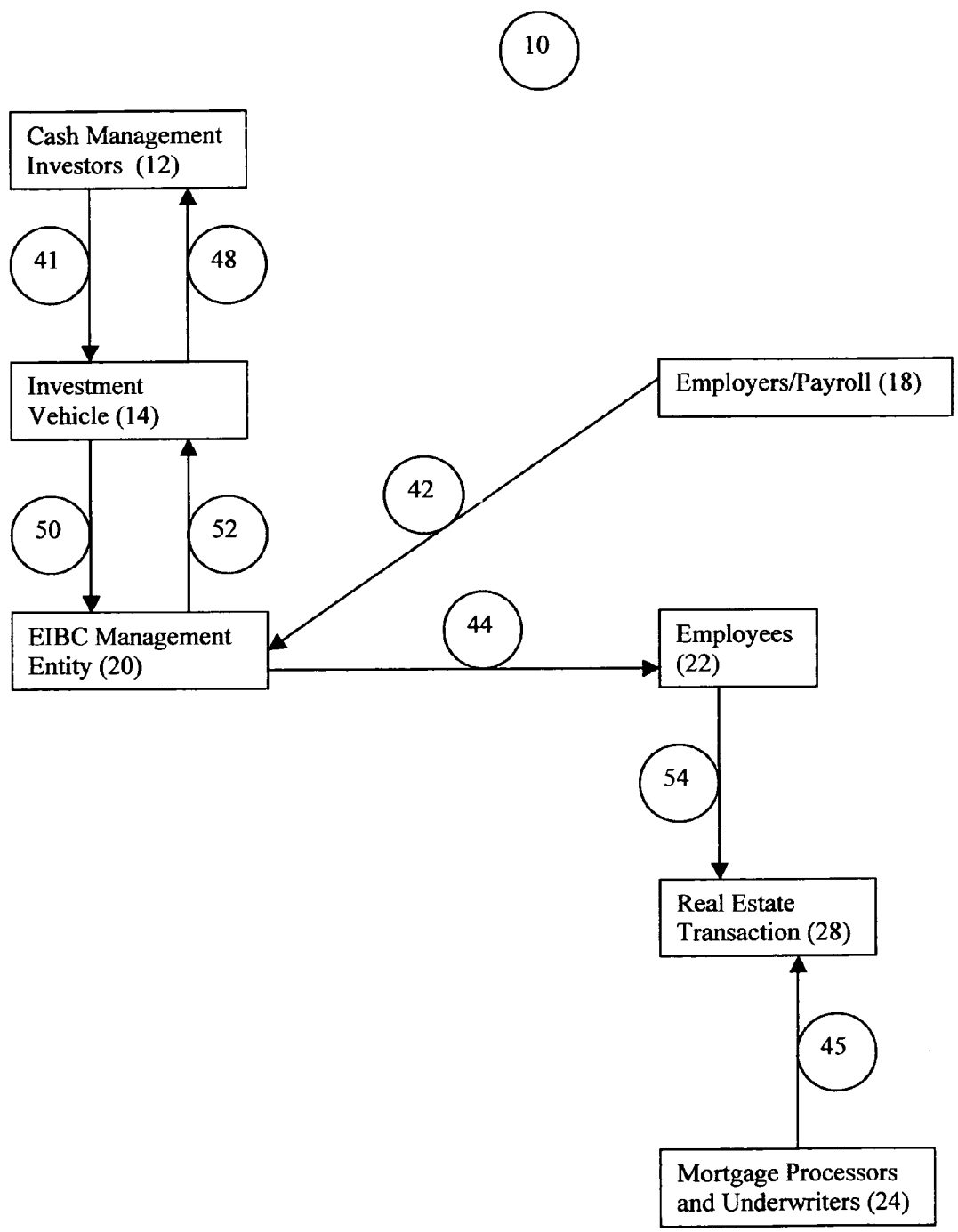
FIG. 5 is an alternative embodiment of a flow diagram showing the monetization, disbursement, and repayment of funds from the investment vehicle of the present invention.
Figure 6:
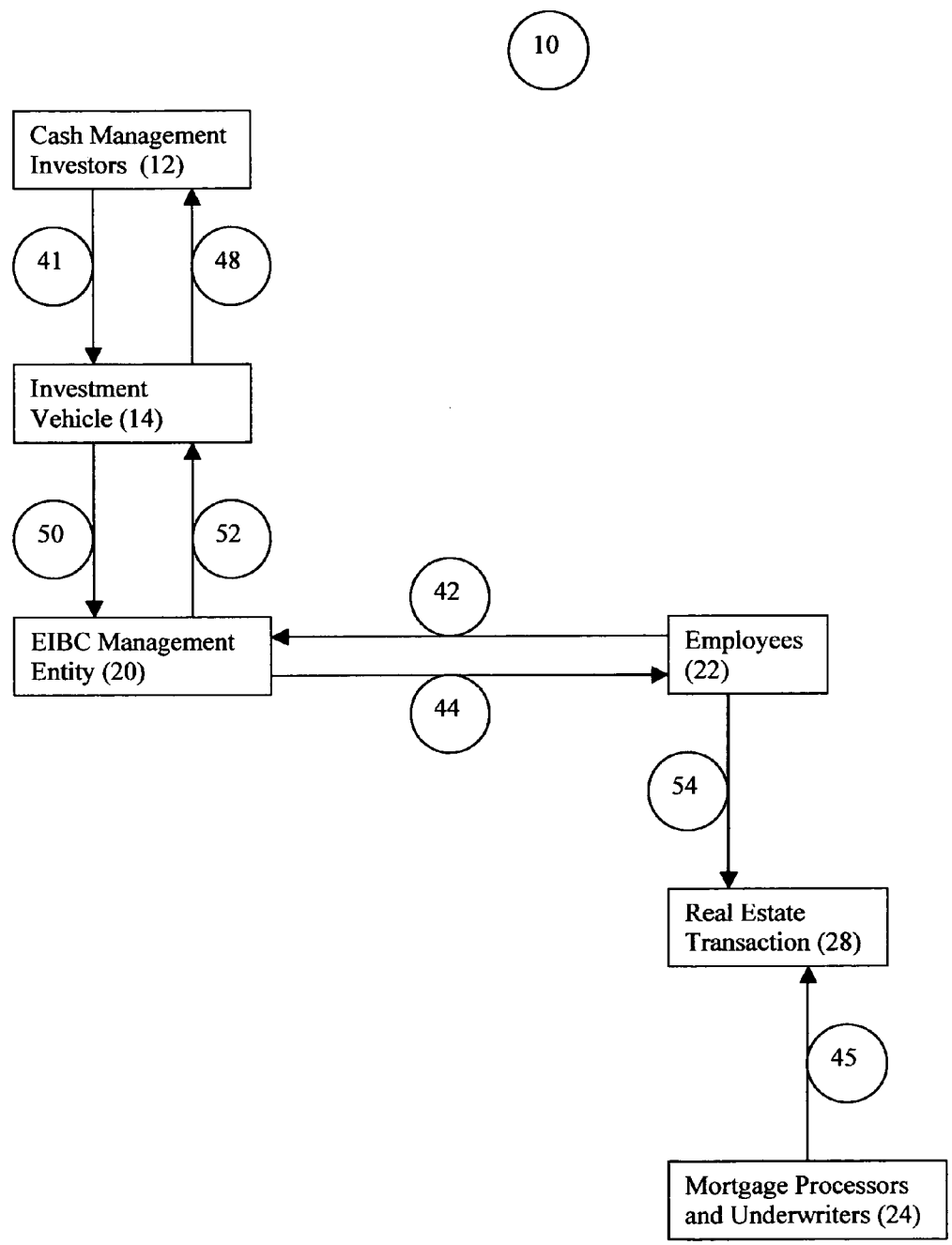
FIG. 6 is an alternative embodiment of a flow diagram showing the monetization, disbursement, and repayment of funds from the investment vehicle of the present invention.

Further alternatives as shown in FIGS. 5 and 6, show the VECEE funds may be distributed 50 from the investment vehicle 14 and transferred 44 directly to the employee 22 independent of both the employer 18 and the financial institution 16, via the EIBC management entity 20. In conjunction with these alternatives, as shown in FIG. 4, an access request 30 is received directly by, and is subject to the direction 37 of, the EIBC management entity 20 as opposed to the request 38 received via 34 the financial institution 16 or as opposed to (see FIG. 3) the request 47 received via 32 the employer 18. By way of example for all embodiments and FIGS., mortgage processors and underwriters 24 fund 45 a first mortgage for a real estate transaction 28, as is customary.

Referring to FIGS. 1 & 2, the VECEE funds are paid back by the employee's 22 continuing employment with the employer 18 and the VECEE funds are remitted 42 to the financial institution 16 by the employer 18 via payroll deduction. The VECEE funds may be remitted 42 by employer 18 direct electronic deposit via payroll deduction, debits from employee 22 bank accounts after direct deposit of payroll, checks or any other remitting method as known in the art, without departing from the scope of the present invention. The VECEE funds are then further remitted 46 to the EIBC management entity 20, which then redeposits 52 the funds into the investment vehicle 14.

Alternatively as shown in FIG. 5, the VECEE funds may be remitted 42 directly to the EIBC management entity 20 independent of the financial institution 16, via the employers payroll system 18.

Further alternatively as shown in FIG. 6, the remitting 42 of VECEE funds may be directly to the EIBC management entity 20 from the employee 22. Thereupon, the VECEE funds are redeposited 52 into the investment vehicle 14 via the EIBC management entity 20 directly from employee 22, instead of via the financial institution 16 and/or employer 18, as shown in FIGS. 1, 2 & 5.

The EIBC management entity 20 is compensated for its roles in management and administration by adding predetermined fees to the amount of VECEE funds accessed by the employee 22. The cash management investors 12 are then paid 48 income and principal funds from the investment vehicle 14.

The relationships of the participants, with respect to the investment vehicle 14 being accessed by an employee 22, is shown in FIG. 3. The EIBC management entity 20 designs and creates the investment vehicle 14, for the express use of employers 18 to make accessible the VECEE funds to employees 22 when an employee 22 wishes to engage in a predetermined economic activity. The specific parameters for the investment vehicle 14 and the marketing, administration and management 37 thereof are designed by the EIBC management entity 20 and are marketed, administered and distributed 30 directly to the employee 22. Alternatively, marketing, administration and distribution to the employee 22 may be indirect, 32 and 47, via the employer 18, or indirect, 34, 43 and 47, (or 34 and 38 as shown in FIG. 4) via the financial institution 16. In any and all configurations, a predetermined portion of the investment vehicle 14 marketing, management and administration 37 is assumed by the EIBC management entity 20.

More specifically with respect to the relationships of the participants shown in FIG. 3, the EIBC management entity 20 handles the administrative details that often cause employers 18 to not offer such a benefit to employees 22. The EIBC management entity 20 creates a relationship 34 with a financial institution 16 to administer 37 the VECEE funds of the investment vehicle 14. The EIBC management entity 20 directs the relationship 36 between the financial institution 16 and the investment vehicle 14, creates terms of administration and fees, and serves as an intermediary for the flow of funds, 40 and 46, shown in FIGS. 1 & 2. The EIBC management entity 20 licenses 34 the financial institutions 16 to access the investment vehicle 14 and establishes the terms for the use and documentation of the VECEE funds. The EIBC management entity 20 supplies, 30, 32 and 34, the employees 22, employers 18 and the financial institutions 16, respectively, with preferably cash management investor 12 approved qualification criteria for VECEE funds access (e.g., a minimum employment history, work performance, attendance, community goals, etc.). The EIBC management entity 20 will establish additional qualification criteria, such as the Fair Isaac Corporation ("FICO") scoring levels, allowable Combined Loan To Value Ratios, and Debt To Income Ratios when the VECEE funds are being used for a real estate transaction 28. The EIBC management entity 20 assumes a predetermined portion 32 of employer 18 participation in agreement processing via preferably a subscription or contract for service agreements as described below (e.g., handling VECEE funds access requests 47, 38, processing associated paperwork, monitoring VECEE funds flow, determining the time period for the pay back 42, etc.). Additionally, the EIBC management entity 20 establishes lines of access (e.g., via conventional communication mechanisms such as internet, phone, fax, mail, and courier services, etc.) for employees 22, employers 18, and financial institutions 16 (30, 32, and 34 respectively) to calculate and evaluate the level of access to VECEE funds from the investment vehicle 14.

Further and even more specifically to the relationships, the EIBC management entity 20 provides a VECEE funds access program 30 to employees 22 via preferably the subscription or contract for services agreement 32 executed between the EIBC management entity 20 and the employer 18. Additionally, the EIBC management entity 20 may provide a VECEE funds access program 30 to employees 22 directly. The EIBC management entity 20 may also provide 32 employers 18 with access to licensing agreements, terms, and conditions 34 between the EIBC management entity 20 and the financial institutions 16, pertaining to such VECEE funds programs.

Generally regarding FIGS. 1 & 2, the VECEE funds may be used to accomplish a variety of predetermined economic activities of employees 22. By way of example, the VECEE funds may be used by the employee 22, in conjunction with home mortgage processors 24, to take part in a real estate transaction 28. The employer 18 is not involved in the employee's 22 housing selection or mortgage application process beyond a tertiary role of supplying access 32 to payroll accounts, employee 22 employment criteria, and other good faith involvement as is customary. The mortgage processors 24 include in the application process the VECEE funds requested 47 by the employee 22, thereby producing a mortgage with greater employee 22 asset availability for the real estate transaction 28. The EIBC management entity 20 creates new underwriting guidelines 39 to be used 45 when conducting real estate transactions 28 to favorably recognize the existence and availability of the VECEE funds during the application process.

Subscribing employers 18 will not assume the risk or be responsible for the repayment of the outstanding balance of the VECEE funds received by an employee 22 should the employee 22 default on pay back 42, should the employee 22 voluntarily leave employment, or be dismissed for cause prior to fulfillment of the terms of the pay back period. Whereby, should the employee 22 fail to make scheduled repayments 42 of the accessed VECEE funds, the EIBC management entity 20 has the right to pursue collection of the outstanding balance of the VECEE funds received by such an employee 22 on behalf of the investment vehicle 14 and the cash management investors 12.

Preferably the employee 22 signs and executes 30 a Work Equity Note™ agreement, designed and administered by the EIBC management entity 20. Furthermore, all participating employees 22 will be required to include terms in the Work Equity Note™ agreement, which direct 30 subsequent employers 18 to honor the VECEE funds pay back 42 terms should the employee 22 voluntarily or involuntarily change employers 18. A preferred additional feature of the Work Equity Note™ agreement will require participating employees 22 to sign a second mortgage note with the financial institution 16 and/or the EIBC management entity 20, should the employee 22 use the VECEE funds for a real estate transaction 28.

While only four embodiments of a method for providing funding of and access to an investment vehicle of the present invention have been described, others may be possible without departing from the scope of the following claims.

What is claimed is:

1. A method for providing funding of and access to an investment vehicle, comprising the steps of:
   establishing an investment vehicle;
   monetizing said investment vehicle by depositing funds therein by a plurality of cash management investors;
   paying a subscription fee to a management entity by an employer;
   receiving a request for said funds by an employee of said employer via an internet interface, wherein said employee and a credit union organized by employees of said subscribing employer, of which said employee is a member, being independent from said plurality of cash management investors in said investment vehicle distributing said funds from said investment vehicle to a financial institution via said management entity upon direction of said management entity in response to said employee's request;
   transferring said funds from said financial institution to said employee via said employer; utilizing said funds for a predetermined economic activity by said employee;
   remitting said funds to said financial institution from said employee's subsequent earnings via an electronic payroll of said employer system;
   redepositing said funds, remitted to said financial institution, into said investment vehicle via said management entity; and
   wherein the basis for the investment vehicle is the value of an employee's continuing employment with said employer.

2. The method of claim 1 wherein the investment vehicle is a securitized investment vehicle.

3. The method of claim 1 wherein the predetermined economic activity is a real estate transaction.

4. The method of claim 1 wherein the request for said funds is made via conventional communication mechanisms.

5. The method of claim 1 wherein the investment vehicle further comprises signing an agreement by an employee directing subsequent employers to remit said funds to said financial institution.

6. A method for providing funding of and access to an investment vehicle, comprising the steps of: establishing an investment vehicle;
monetizing said investment vehicle by depositing funds therein by a plurality of cash management investors;
paying a subscription fee to a management entity by an employer;
receiving a request for said funds by an employee of said employer via an internet interface, wherein funds of said employee and funds of a credit union organized by employees of said subscribing employer, of which said employee is a member, being independent from said funds deposited by said plurality of cash management investors in said investment vehicle;
distributing said funds from said investment vehicle to a financial institution via said management entity upon direction of said management entity in response to said employee's request;
transferring said funds from said financial institution to said employee via said employer;
utilizing said funds for a predetermined economic activity by said employee;
remitting said funds to said financial institution from said employee's subsequent earnings via an electronic payroll system of said employer;
redepositing said funds, remitted to said financial institution, into said investment vehicle via said management entity; and
wherein the basis for the investment vehicle is the value of an employee's continuing employment with said employer.

7. The method of claim 6 wherein the investment vehicle further comprises signing an agreement by an employee directing subsequent employers to remit said funds to said management entity.

8. The method of claim 6 wherein the investment vehicle is a securitized investment vehicle.

9. The method of claim 6 wherein the predetermined economic activity is a real estate transaction.

10. The method of claim 6 wherein the request for said funds is made via conventional communication mechanisms.

11. A method for providing funding of and access to an investment vehicle, comprising the steps of: establishing an investment vehicle;
monetizing said investment vehicle by depositing funds therein by a plurality of cash management investors;
paying a subscription fee to a management entity by an employer;
receiving a request for said funds by an employee of said employer via an internet interface, wherein said funds deposited in said investment vehicle are selected from a group independent from funds of said employee and funds of a credit union organized by employees of said subscribing employer, of which said employee is a member;
distributing said funds from said investment vehicle to a financial institution via management entity upon direction of said management entity in response to said employee's request;
transferring said funds from said financial institution to said employee via said employer;
utilizing said funds for a predetermined economic activity by said employee;
remitting said funds to said financial institution from said employee's subsequent earnings via an electronic payroll system of said employer;
redepositing said funds, remitted to said financial institution, into said investment vehicle via said management entity; and
wherein the basis for the investment vehicle is the value of an employee's continuing employment with said employer.

12. The method of claim 11 wherein the predetermined economic activity is a real estate transaction.

13. The method of claim 11 wherein the investment vehicle further comprises signing an agreement by an employee directing subsequent employers to remit said funds to said management entity.

14. The method of claim 11 wherein the request for said funds is made via conventional communication mechanisms.

15. The method of claim 11 wherein the investment vehicle is a securitized investment vehicle.

* * * * *